2,883,330
LIQUID METAL COMPOSITIONS CONTAINING URANIUM

Robert J. Teitel, East Patchogue, N.Y., assignor to the United States of America as represented by the United States Atomic Energy Commission No Drawing. Application May 26, 1955
Serial No. 511,444

9 Claims. (Cl. 204—193.2)

The present invention relates to liquid metal compositions containing a solid uranium compound dispersed therein.

In order to produce useful power from nuclear fuels, such as uranium, it is necessary to transfer heat produced from the fissioning of the fuels to an apparatus capable of converting heat into other forms of useful energy. The transfer of heat from the region of fission heat production to a region of heat utilization is one of the problems which influences the choice of materials to be used in reactors. Liquid metals have extremely good heat transfer properties and it has been proposed to employ them in reactors. The choice is limited by such factors as melting point, nuclear properties and corrosion properties. The fissionable metals themselves have very high melting points. Only a few metals, including lead and bismuth, have the needed properties. However, the amount of uranium which can be dissolved in these metals is limited. It is sometimes desirable to have higher concentrations of the uranium in the liquid metal without sacrifice of the desirable fluid properties.

The present invention has, as one of its objects, the provision of a nuclear fuel in a liquid metal medium in higher concentrations than can be achieved by solution. Another object is to incorporate uranium in a liquid metal in the form of a dispersion which is not subject to settling out. Other objects will be in part apparent and in part pointed out hereinafter.

In one of its broader aspects, the objects of the present invention are achieved by forming a dispersion of an intermetallic compound of uranium and tin in a liquid metal composition.

Uranium combines with tin to form the intermetallic compound $USn_3$. It has been found that this compound may be incorporated into a liquid bath containing bismuth, or lead-bismuth components, if a relatively small percentage of tin is also included in the bath. The solid $USn_3$ exists in equilibrium with the liquid media containing high percentages of lead and bismuth only if a small percentage of tin is present. The composition has a number of desirable properties, which make it suitable for use in connection with nuclear reactors. Because only a relatively small percentage of tin must be included in the liquid to keep the $USn_3$ compound intact, the composition has a relatively low thermal neutron cross section, approaching that of the other components of the liquid bath. The low density $USn_3$ compound can thus be used in reactors with a minimum sacrifice of nuclear properties, the tin having the poorest properties.

When a dispersion of a solid compound in a liquid metal is employed in a reactor, it is desirable to keep the solid suspended in the liquid medium and for this reason it is preferred to minimize the difference in density between the solid and liquid phases. It has been found that $USn_3$ can be maintained as a dispersion in equilibrium with a liquid having a density almost identical to that of the solid. Small variations in relative density of the two media result from temperature changes. The particles can be caused to float and sink in a static liquid medium of approximately identical density by respectively lowering and raising the temperature. The liquid composition can thus be chosen to suspend the particles at a particular operating temperature.

The density of $USn_3$ can be approximately matched at a temperature between 400 and 600° C. by a liquid metal composition containing 3 to 5% tin, 35 to 40% bismuth and the remainder lead. Liquid compositions near the ternary eutectic composition of tin, lead and bismuth have freezing points as low as 95° C. and can also be used as dispersion media for the $USn_3$. A useful liquid composition having a low melting point and density close to that of $USn_3$ contains approximately 6% tin, 56.2% bismuth and 37.8% lead. Unless otherwise specified in the specification and claims hereof the term percentage shall be percentage by weight.

Another property of these equilbrium compositions which facilitates their use in connection with reactors is the tendency of uranium to combine with tin in compositions containing relatively small percentages of tin. This property is useful when preparing the compositions and also when they are treated after reutron irradiation to remove radiation products. In order to prepare the dispersions, the uranium is added as a finely divided powder to the liquid composition containing tin and a finely divided dispersion of $USn_3$ forms due to the selective affinity of uranium for tin. The compound can also be formed by adding uranium in an undivided form, heating to render the composition completely liquid and cooling. This procedure also results in the formation of the dispersed $USn_3$ compound, the particles of which have diameters principally in the range of about 40 microns. Quantities of uranium in excess of the solubility of the metal must be added to form the dispersion.

After the dispersions of $USn_3$ in a liquid have been exposed to neutron irradiation for a length of time, radiation products form both in the solid and in the liquid. These products can be removed from the liquid by separating the liquid and solid phases, as for example by filtration, and treating the separated liquid by distillation or other suitable means.

The above method can also be used in connection with the removal of such products from the solid. For this purpose the dispersion is heated to completely liquefy the $USn_3$ and the liquefied composition is then cooled to reform the dispersion. It has been found that the ratio of the concentration of radiation products in the solid as compared to that in the liquid is much lower after the dispersion has been liquefied and reformed than it is before this treatment. According to the present invention, the radiation products are removed from the solid by heating to liquefy the dispersion, cooling to reform the solid and then separating the liquid and solid phases and treating the liquid to remove the radiation products.

When a concentrated dispersion, for example, one having a high volumetric percentage of solids of the order of 25%, is treated by this method, it is preferred to dilute the dispersion by addition of a quantity of the liquid medium before the heating and cooling operations are carried out. It may be sufficient, depending on the use to be made of the dispersion, to remove only as much of the dispersion medium after the heat treatment as was added prior to the treatment. This procedure may be employed, for example, in the continuous batchwise treatment of separate small portions of dispersion removed from a large batch of the composition in a reactor. The use of such purification procedures is feasible in connection with dispersions of uranium because of the low concentration of the uranium in the liquid phase.

One advantage of liquid compositions containing a high specific concentration of uranium such as those provided by the present invention is the ease of processing to remove neutron poisons.

The ratio of the concentration of poisons, such as fission products, to that of uranium, is one of the principal factors governing the utility of liquid fuels in a reactor. If the ratio is too high too many neutrons are captured by the poisons and the nuclear reaction is not economic from the point of view of neutrons produced. This is particularly important where such neutrons are used to breed fissionable materials from fertile materials. However, because of the high concentration of uranium in the dispersion compositions of the present invention, correspondingly higher concentrations of poisons can be tolerated. A process which does not reduce the poison concentration to the low values needed for use in connection with solution fuels can be used in processing the dispersion fuels of the subject invention. One method which may be used is the method described in the patent of Bareis, U.S. Patent No. 2,758,023.

The term radiation products as used in this application includes both fission products and plutonium.

In order to flow a dispersion, it is desirable that the particles be of relatively small size and have equiaxed shape, i.e., the particle dimensions should be nearly equal along the three particle axes. The $USn_3$ compound forms equiaxed particles suitable for flowing in dispersed form through narrow flow passages such as those encountered in heat exchange apparatus. Particles of small size can be precipitated by incorporating finely divided uranium into the liquid medium containing tin. Particles of size suitable for flowing can also be prepared by cooling a melt in which uranium is completely in solution.

Where it is desired to have extremely finely divided $USn_3$ dispersed in the liquid media referred to above the following procedure can be employed. The uranium is hydrided by reaction with hydrogen at about 250° C. and the hydride is immersed directly into the liquid metal medium. When this procedure is followed, $USn_3$ particles of submicroscopic size form in the liquid.

For purposes of flowing the dispersion composition, the quantity of solid in the liquid as well as the size of the particles of the solid, is important. Approximately 10% uranium can be incorporated in a liquid dispersion medium without loss of flow properties of the liquid by forming a $USn_3$ dispersion having particles less than two millimeters in average diameter. When such compositions are to be employed in nuclear reactors, a tin concentration in the liquid of between 4 and 20% is preferred. This range provides sufficient tin to keep the $USn_3$ dispersed as a solid without a net loss of the nuclear properties of the liquid if the uranium concentration is proportionately high. The use of uranium enriched in one of its fissionable isotopes is preferred when these compositions are to be used as nuclear fuels.

Compositions containing lead in excess of 70% result in substitution of some lead in the $USn_3$ compound and since this affects the density of the solid, it is preferable to disperse $USn_3$ in liquids containing less than 70% lead where density is an important consideration.

Where density considerations are not critical $USn_3$ can be dispersed in a liquid composition containing about 3% tin and the remainder lead.

$USn_3$ can also be dispersed in composition containing about 10% tin and the remainder bismuth.

For increasing ratios of bismuth to lead in the liquid phase increasing percentages (3% to 10%) of tin are needed in the liquid.

The inclusion of radiogenic lead in the compositions results in better nuclear properties because of the better nuclear properties of radiogenic lead.

From the foregoing, it is apparent that the subject invention provides a number of compositions and methods which result in containing uranium in high concentration in liquid media.

Since many embodiments might be made in the present invention and since many changes might be made in the embodiment described, it is to be understood that the foregoing description is to be interpreted as illustrative only and not in a limiting sense.

I claim:

1. As a composition of matter, $USn_3$ dispersed in a liquid metal medium containing at least 3% tin and the remainder bismuth and radiogenic lead.

2. As a composition of matter, the compound $USn_3$ dispersed in a liquid metal composition containing 6% tin, 56.2% bismuth and 37.8% lead.

3. As a composition of matter, the compound $USn_3$ dispersed in a liquid metal composition containing 3 to 5% tin, 35 to 40% bismuth and the remainder lead.

4. As a composition of matter, the compound $USn_3$ dispersed in a liquid metal composition containing not less than 10% tin and the remainder bismuth.

5. The method of forming a finely divided dispersion of $USn_3$ in a liquid composition containing lead, bismuth and tin which comprises introducing a quantity of finely divided uranium into the liquid composition in excess of the solubility of the uranium at the temperature of introduction.

6. The method of forming $USn_3$ dispersed in a liquid metal medium containing 4 to 19% tin, less than 70% lead and the remainder bismuth, which comprises heating the medium to a temperature above the melting point and below the boiling point thereof introducing uranium therein allowing the uranium to dissolve and then cooling the composition to a temperature at which the solubility of uranium is exceeded.

7. The method of forming a dispersion of $USn_3$ in a liquid metal composition containing lead, bismuth and tin, the particles of which are of submicroscopic size, which comprises forming a hydride of uranium and immersing a quantity of the hydride into said composition in excess of the solubility of uranium in the composition.

8. The method of removing radiation products from $USn_3$ dispersed in a liquid metal medium containing tin which comprises heating the composition to dissolve the $USn_3$, cooling the composition, separating $USn_3$ from the liquid, separating the radiation products from the liquid and recombining the liquid and $USn_3$.

9. As a composition of matter, a dispersion of $USn_3$ particles in a liquid metal composition containing lead, bismuth and tin, the particles of said dispersions having diameters of less than 2 millimeters and said dispersed particles occupying approximately 25% by volume of the composition.

References Cited in the file of this patent

Nucleonics, July 1954, vol. 12, No. 7, pp. 14–15.

Williams et al.: "Nuclear Engineering," Part I, pub. by American Institute of Chemical Engineers, Progress Symposium Series No. 11, vol. 50, 1954, pages 245–252, note particularly page 251.